US006698801B1

(12) United States Patent
Boecking

(10) Patent No.: US 6,698,801 B1
(45) Date of Patent: Mar. 2, 2004

(54) PRESTRESSED WELDED CONNECTION STUB FOR A FUEL INJECTION SYSTEM FOR INTERNAL COMBUSTION ENGINES

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,254

(22) PCT Filed: May 19, 2000

(86) PCT No.: PCT/DE00/01619

§ 371 (c)(1), (2), (4) Date: May 11, 2001

(87) PCT Pub. No.: WO01/06167

PCT Pub. Date: Jan. 25, 2001

(30) Foreign Application Priority Data

Jul. 15, 1998 (DE) ........................................ 199 33 256

(51) Int. Cl.[7] ................................................ F16L 13/02

(52) U.S. Cl. ................. 285/288.1; 285/141; 285/288.5; 285/386

(58) Field of Search ........................... 285/141.1, 142.1, 285/143.1, 201, 288.1, 384, 288.5, 288.6, 386

(56) References Cited

U.S. PATENT DOCUMENTS

| | | | | | |
|---|---|---|---|---|---|
| 1,604,531 | A | * | 10/1926 | Murray | 285/288.1 X |
| 1,648,392 | A | * | 11/1927 | Fuetterer | 285/288.1 |
| 2,015,246 | A | * | 9/1935 | Taylor | 285/288.1 X |
| 2,050,339 | A | * | 8/1936 | Kidd | 285/288.1 |
| 2,495,615 | A | * | 1/1950 | Vander Clute | 285/141.1 X |
| 4,316,624 | A | * | 2/1982 | Davlin | 285/141.1 |
| 4,645,242 | A | * | 2/1987 | Coleman et al. | 285/141.1 |
| 4,770,446 | A | * | 9/1988 | Keller | 285/141.1 |
| 5,775,302 | A | | 7/1998 | Juergen et al. | |
| 5,887,910 | A | * | 3/1999 | Usui | 285/288.1 |
| 6,126,208 | A | * | 10/2000 | Asada et al. | 285/288.1 |

FOREIGN PATENT DOCUMENTS

| | | | | |
|---|---|---|---|---|
| EP | 0 751 336 A | | 2/1997 | |
| EP | 0 866 221 A | | 9/1998 | |
| JP | 1188792 | * | 7/1989 | 285/288.1 X |
| JP | 4312278 | * | 11/1992 | 285/288.1 X |

* cited by examiner

*Primary Examiner*—David Bochna
(74) *Attorney, Agent, or Firm*—Ronald E. Greigg

(57) ABSTRACT

Disclosed is a connection stub and a housing, in particular a high-pressure fuel reservoir, for a fuel injection system for internal combustion engines with a welded connection stub, in which sealing faces between the housing and the connection stub are provided, spatially separately from the weld seam.

20 Claims, 3 Drawing Sheets

PRESTRESSED WELDED CONNECTION STUB FOR A FUEL INJECTION SYSTEM FOR INTERNAL COMBUSTION ENGINES

CROSS-REFERENCE TO RELATED APPLICATIONS

This application is a 35 USC 371 application of PCT/DE 00/01619 filed on May 19, 2000.

BACKGROUND OF THE INVENTION

1. Field of the Invention

The invention relates to a connection stub to a housing, in particular a high-pressure fuel reservoir, and particulary a connection stub connected to a housing for a fuel injection system for internal combustion engines, as generically defined by the preamble to claim 9, and to a method for connecting the connection stub to the housing.

2. Description of the Prior Art

The various components of a fuel injection system, such as the high-pressure fuel pump, the high- pressure fuel reservoir and injection nozzles, typically communicate with one another through hydraulic lines. Sealing off these connections is often done with the aid of clamping nuts slipped over the hydraulic line, which are screwed to a connection stub that communicates in a fluid-tight fashion with the housing of the applicable component group. The high-pressure fuel reservoir in particular has many such connection stubs, which by way of example allow fuel delivery and fuel outflow into and out of the reservoir.

Connection stubs that are welded to the housing are known. A disadvantage of the known welded constructions is that the weld seam has two functions. First, it makes a fluid-tight connection between the housing and the connection stub, and second, it transmits the forces acting between the connection stub and the housing. Especially in modern fuel injection systems, the high, swelling pressures lead to high, swelling tensile stresses in the weld seam.

A further disadvantage of the known welded constructions is that in the welding operation, splatters or mounds of welding material can enter the high-pressure region of the line or of the housing, which can cause functional disturbances of the fuel injection system.

SUMMARY OF THE INVENTION

The object of the present invention is to furnish a connection stub and a housing and a connection stub communicating with the housing that seals off the high-pressure region of the housing and of the connection stub reliably from the environment, and in which the high-pressure region is reliably protected against particles that can be provided when the two components are joined to one another.

This object is attained according to the invention by a connection stub for a fuel injection system for internal combustion engines, having a through bore extending in the direction of the longitudinal axis, having a first end of the connection stub, on which a collar is disposed concentrically with the through bore, and having a second end, on which a sealing face for a high-pressure line and means for connecting the high-pressure line and the connection stub are disposed; the connection stub, on its first end, has a clamping element, disposed concentrically with the through bore, on the end of which element, remote from the first end of the connection stub, a sealing face is disposed.

SUMMARY OF THE INVENTION

In the connection stub of the invention, a clamping element is provided between the collar, which effects the axial fixation of the connection stub in the housing wall, and the sealing face. As a result of this spatial separation of the functions of “holding” and “sealing” of the connection stub, both the sealing face and the connection of the connection stub and the housing can be designed optimally.

The separation of the sealing face and the connection also prevents welding splashes or chips that occur in the joining process from being able to reach the high-pressure region of the connection stub, the housing, or the high-pressure line.

One feature of the invention provides that the clamping element protrudes past the collar in the direction of the longitudinal axis, so that the outside diameter of the connection stub is kept small, and a high spring rate of the clamping element is made possible.

In another variant of the connection stub, it is provided that the clamping element has a first and a second portion, the first portion extending from the first end of the connection stub in the direction of the second end of the connection stub, and the second portion being disposed concentrically with the first portion and extending in the opposite direction. This reduces the structural length of the connection stub, and lower spring rates can be attained. Furthermore, the notch effect in the housing, with which the connection stub is connected, is slight, since the sealing face of the housing can be located close to the surface of the housing.

In a further feature of the invention, the sealing face is frustoconical, so that the operating pressure of the fuel injection system increases the pressure per unit of surface area between the sealing faces of the connection stub and of the housing. This further improves the tightness.

Furthermore, the sealing face in the form of a circular-annular face is provided, thus simplifying both the production and the ensuing inspection of the connection stub.

In a further supplement of the invention, the outside diameter of the clamping element is at least in part smaller than the diameter of the sealing face, so that when the connection stub and the housing are joined together, the clamping element is deformed inward in the direction of its longitudinal axis. As a consequence of this elastic or plastic deformation, the operating pressure of the fuel injection system increases the pressure per unit of surface area of the sealing faces and thus further enhances the tightness.

In a further version of the invention, the first portion of the clamping element is displaceable relative to the second portion in the direction of the sealing face of the clamping element, so that the force with which the means for connecting the high-pressure line and the connection stub presses the high-pressure line against the sealing face on the second end of the connection stub at least in part effects an additional pressure per unit of surface area of the sealing faces between the housing and the connection stub.

In a further version, the sealing face of the clamping element, projected in the direction of the longitudinal axis of the connection stub onto the area enclosed by the collar is located inside the area enclosed by the collar. As a result, the compression forces resulting from the operating pressure of the fuel injection system and acting on the connection of the connection stub and the housing are reduced, since the effective area is reduced. This is advantageous in two respects. Since the area varies as the square of the diameter, the compression forces are reduced disproportionately. Furthermore, the amplitude of the swelling stress on the connection of the connection stub and the housing decreases, thus additionally enhancing the fatigue strength of the connection.

The object stated at the outset is also attained by a housing, in particular a high-pressure fuel reservoir, for a fuel injection system for internal combustion engines, and a connection stub, communicating in fluid-tight fashion with the housing and having a through bore; the housing interior and the through bore communicate hydraulically through a bore in the housing, and the means for connecting the housing and the connection stub and the means for sealing the connection of the housing and the connection stub are disposed spatially separately.

Because of the spatial separation of the functions of "holding" and "sealing", these functions can each be designed optimally in terms of construction and production. Furthermore—in contrast to the prior art, in which a weld seam also takes on the function of sealing off from the environment—the notching effect that the operating pressure causes when the fuel reaches the weld seam is dispensed with. In addition, the spatial separation of the functions of "holding" and "sealing" virtually precludes damage to the sealing face when the connection stub and housing are joined together.

One feature of the invention provides that a collar is disposed, concentrically to the through bore, on a first end of the connection stub; that the connection stub, on its first end, has a clamping element disposed concentrically with the through bore, on the end of which clamping element, remote from the first end of the connection stub, a sealing face is disposed; that the bore of the housing, on its end toward the connection stub, has a concentric annular face, whose diameter is equivalent to that of the collar, and a concentric indentation, on the bottom of which there is a sealing face corresponding to the sealing face of the connection stub; and that when the housing and the connection stub are not connected, the axial spacing between the sealing face and the annular face is less than the axial spacing between the sealing face and the collar. This version has the advantage that the sealing faces are disposed in an indentation of the housing and are thus protected especially well from damage. Furthermore, because of the difference in the axial spacing between the sealing face and annular face on the one hand and the axial spacing between the sealing face and the collar on the other, a prestressing of the clamping element and thus a contact pressure on the sealing faces are generated in the joining process. Depending on how great this difference is and how high the spring rate of the clamping element is, the contact pressure can be adapted to operating conditions.

In an alternative version of the invention, it is provided that a collar is disposed, concentrically to the through bore, on a first end of the connection stub; that on the second end of the connection stub, a sealing face for a high-pressure line and means for connecting the high-pressure line and the connection stub are present; that the connection stub, on its first end, has a clamping element disposed concentrically with the through bore, on the end of which clamping element, remote from the first end of the connection stub, a sealing face is disposed; that the clamping element has a first and a second portion, the first portion extending from the first end of the connection stub in the direction of the second end of the connection stub, and the second portion being disposed concentrically with the first portion and extending in the opposite direction; that the bore of the housing, on its end toward the connection stub, has a concentric annular face, whose diameter is equivalent to that of the collar, and a concentric indentation, on the bottom of which there is a sealing face corresponding to the sealing face of the connection stub; and that when the housing and the connection stub are not connected, the axial spacing between the sealing face and the annular face is less than the axial spacing between the sealing face and the collar. In this variant, the structural length of the connection stub is especially short. Furthermore, the spring rate of the clamping element is low, so that the prestressing force can be adjusted precisely. In addition, the indentation in the housing is very shallow, and hence the notch effect is slight.

A further variant provides that a collar and a sealing face are disposed; that the bore of the housing, on its end toward the connection stub, has a concentric annular face, whose diameter is equivalent to that of the collar, and a concentric indentation, on the bottom of which there is a sealing face corresponding to the sealing face of the connection stub; that between the sealing face of the connection stub and the sealing face of the housing, a clamping element provided with a through bore is disposed, which on its ends has sealing faces corresponding to the sealing faces of the connection stub and of the housing; and that the clamping element is longer than the axial spacing between the sealing faces of the connection stub and of the housing, when the collar of the connection stub is resting on the annular face of the housing. Because the clamping element is an independent component, it can be optimally adapted to requirements of production and the choice of material.

In one feature of the invention, in the dismantled state the cone angle of the sealing face of the clamping element is greater than the cone angle of the sealing face in the housing, so that when in the joining of the connection stub and the housing the prestressing is applied, the outer regions of the sealing face are pressed against one another first with a high pressure per unit of surface area. This has the advantage that for the same prestressing force, and despite slight imprecisions of production, a higher pressure per unit of surface area is achieved, and that a moment acts on the clamping element that deforms the clamping element in the direction of the longitudinal axis of the through bore. As a result of this deformation, the operating pressure is further increased and the pressure per unit of surface area of the sealing faces is also increased.

In an embodiment according to the invention, the connection stub and housing are joined by welding. This housing has the advantages of the known welded constructions, such as simple, economical production, without having their disadvantages. In addition, because of the prestressing of the clamping element, once the welding has been done, prestressing permanently exists between the sealing faces of the connection stub and of the housing. The spatial separation of the sealing face and the weld seam prevents welding splatters from penetrating the high-pressure region of the housing, connection stub, and high-pressure line. Finally, the notch effect on the weld seam, which effect may be engendered by the fuel that is at operating pressure, is omitted.

In another embodiment, the clamping element sealing face, projected in the direction of the longitudinal axis of the connection stub onto the area enclosed by the collar, is located inside the area enclosed by the collar; and the sealing face of the housing projected in the direction of the longitudinal axis of the bore onto the area enclosed by the annular face is located inside the area enclosed by the annular face. As a result, the compression forces resulting from the operating pressure of the fuel injection system and acting on the connection of the connection stub and the housing are reduced, since the area on which the operating pressure of the fuel acts is smaller than if the fuel filled the space as far as the weld seam. This is advantageous in two respects. Since the area varies as the square of the diameter, the compression forces are reduced disproportionately. Furthermore, the amplitude of the swelling stress on the connection of the connection stub and the housing decreases, thus additionally enhancing the fatigue strength of the connection.

The object of the invention is also attained by a method for joining a high-pressure housing, in particular a high-pressure fuel reservoir, and a connection stub, in which:

- the clamping element is introduced into the indentation of the housing;
- the clamping element is prestressed;
- the housing and the connection stub are welded in the prestressed state; and
- the prestressing is maintained until the weld seam has cooled down enough that it can transmit the prestressing.

This method is simple to execute, and the product produced by this method has the advantages discussed above.

BRIEF DESCRIPTION OF THE DRAWINGS

Further advantages and advantageous features of the invention can be learned from the ensuing description taken with, the drawings, in which.

DESCRIPTION OF THE PREFERRED EMBODIMENTS

Figure 1:
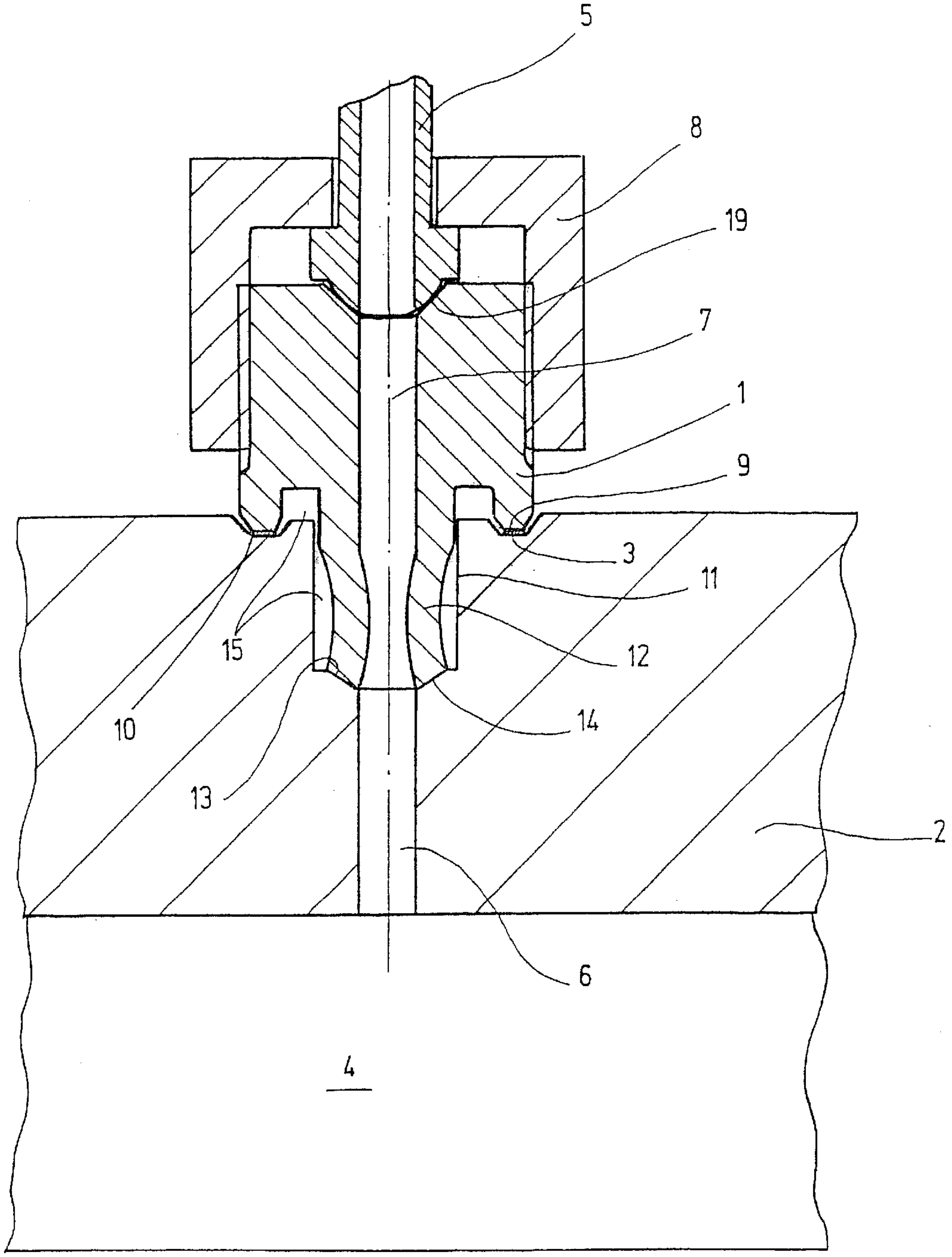
FIG. 1 is a sectioned view of first exemplary embodiment of a connection stub according to the invention and of a housing in longitudinal section.

In FIG. 1, a first version of a connection stub 1 of the invention is shown. The connection stub 1 is welded to the wall of a housing 2. The weld seam 3 extends all the way around and can be produced by the most various welding methods. The connection stub 1 has the task of establishing a hydraulic communication between the interior 4 of the housing 2 and a high-pressure line 5. For this reason, the housing 2 has a bore 6, which communicates with a through bore 7 of the connection stub 1. The screw fastening of the connection stub 1 and the high-pressure line 5 by means of a lock nut 8 is as in the prior art.

On the end of the connection stub 1 opposite the lock nut 8, the connection stub has a collar 9. This collar 9 acts as a stop in the direction of the longitudinal axis of the connection stub 1, when the collar is seated on a corresponding annular face 10 of the housing 2. This fixes the position of the connection stub 1 relative to the housing 2 in the welding operation. A clamping element 12 of the connection stub 1 protrudes into an indentation 11 of the housing 2. The outside diameter of the clamping element 12 can be dimensioned such that the connection stub is centered in the indentation 11 by the clamping element 12. The clamping element 12, on its end, has a frustoconical sealing face 13. This sealing face 13 rests on a sealing face 14 of the housing 2. As a result, it is assured that the voids 15 between the connection stub 1 and the housing 2 will not be filled with fuel, and thus no attendant compression forces will act on the weld seam 3.

Since the connection stub 1 is welded to the housing 2 in such a way that the clamping element 12 is prestressed in the axial direction, the clamping element 12 is deformed inward as shown. As a result of this deformation of the clamping element 12, the internal pressure in the through bore 7 increases the contact force between the sealing faces 13 and 14. Furthermore, after welding, it is possible by measuring the diameter of the through bore 7 to check whether an adequate prestressing force exists between the sealing faces 13 and 14.

Various courses can be taken in order to assure a controlled inward deformation of the clamping element 12. For example, the outside diameter of the clamping element 12 can be selected as less than the diameter of the sealing face 13, or by the choice of cone angles of the sealing faces 13 and 14, it can be assured that a bending moment which brings about the desired deformation inward is engendered by the prestressing force. This is the case for instance if the cone angle of the sealing face 13, in the non-prestressed state, is greater than that of the sealing face 14. The difference in the cone angles must be dimensioned such that, when the full prestressing force is applied and the collar 9 is resting on the annular face 10, the tightness between the sealing face 14 of the housing and the sealing face 13 of the clamping element 12 is assured.

Figure 2:
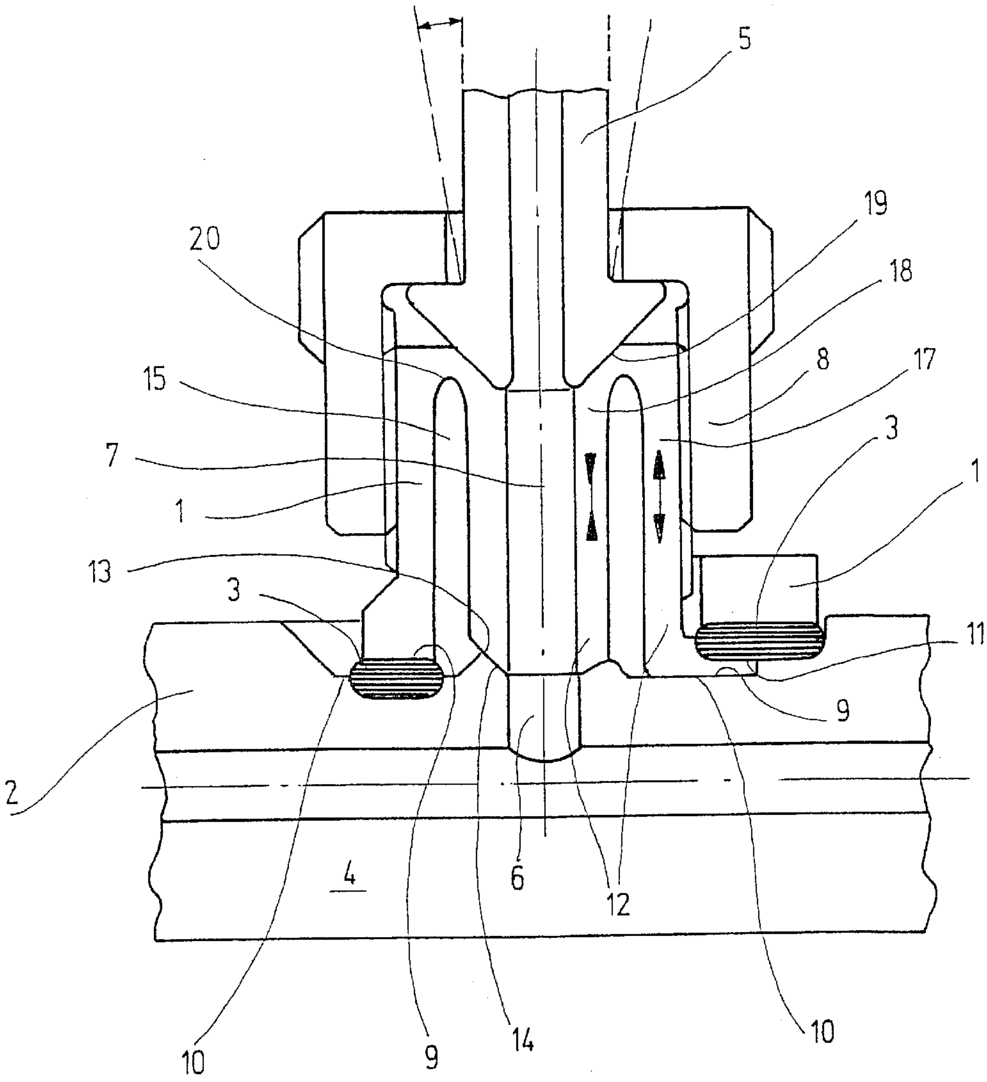
FIG. 2 is a view similar to FIG. 1 showing a second exemplary embodiment of a connection stub according to the invention and of a high-pressure fuel reservoir in longitudinal section.

In FIG. 2, a second embodiment of the connection stub 1 of the invention is shown. The reference numerals used correspond to those of FIG. 1. Differences between the embodiments of FIGS. 1 and 2 exist in particular with regard to the connection of the connection stub 1 and the housing 2 and with regard to the clamping element 12.

On the left-hand side of FIG. 2, a version is shown in which the connection stub 1 is welded by way of its collar 9 to the housing 2.

On the right-hand side of FIG. 2, a variant is shown in which the collar 9 and the weld seam 3 are spatially separated. In this connection of the connection stub 1 and the housing 2, the collar 9 rests on the annular face 10. On the top side of the collar 9, by means of a welded ring 16, an extremely heavy-duty connection of the connection stub 1 and the housing 2 is brought about by the weld seam 3. The collar 9 can, as shown on the right-hand side of FIG. 2, accomplish the centering of the connection stub 1 relative to the bore 6.

The clamping element 12 in this version has a first portion 17 under tension and a second portion 18 under compression. The prestressing of the clamping element 12 is due, similarly to the exemplary embodiment shown in FIG. 1, to the fact that the sealing face 13 is seated on the sealing face 14 of the housing 2, before the collar 9 rests on the annular face 10. If the collar 9 is now pressed until it is on the annular face 10, the prestressing in the clamping element 12 arises, which leads to the desired pressure per unit of surface area between the sealing faces 13 and 14. Because of the great total length of the clamping element 12, which is the sum of the lengths of the first portion 17 and the second portion 18, the spring rate of the clamping element is comparatively low. In an individual case, this can be advantageous if the prestressing force is to be adhered to precisely.

In the exemplary embodiment shown, it can also be seen that the force with which the lock nut 8 presses the high-pressure line 5 against a sealing face 19 of the connection stub 1 is propagated in the second portion 18 of the clamping element 12 and leads to a further increase in the contact pressure between the sealing faces 13 and 14. This effect is enhanced if a transitional region 20, which connects the first and second portions 17 and 18, is embodied as soft.

Figure 3:
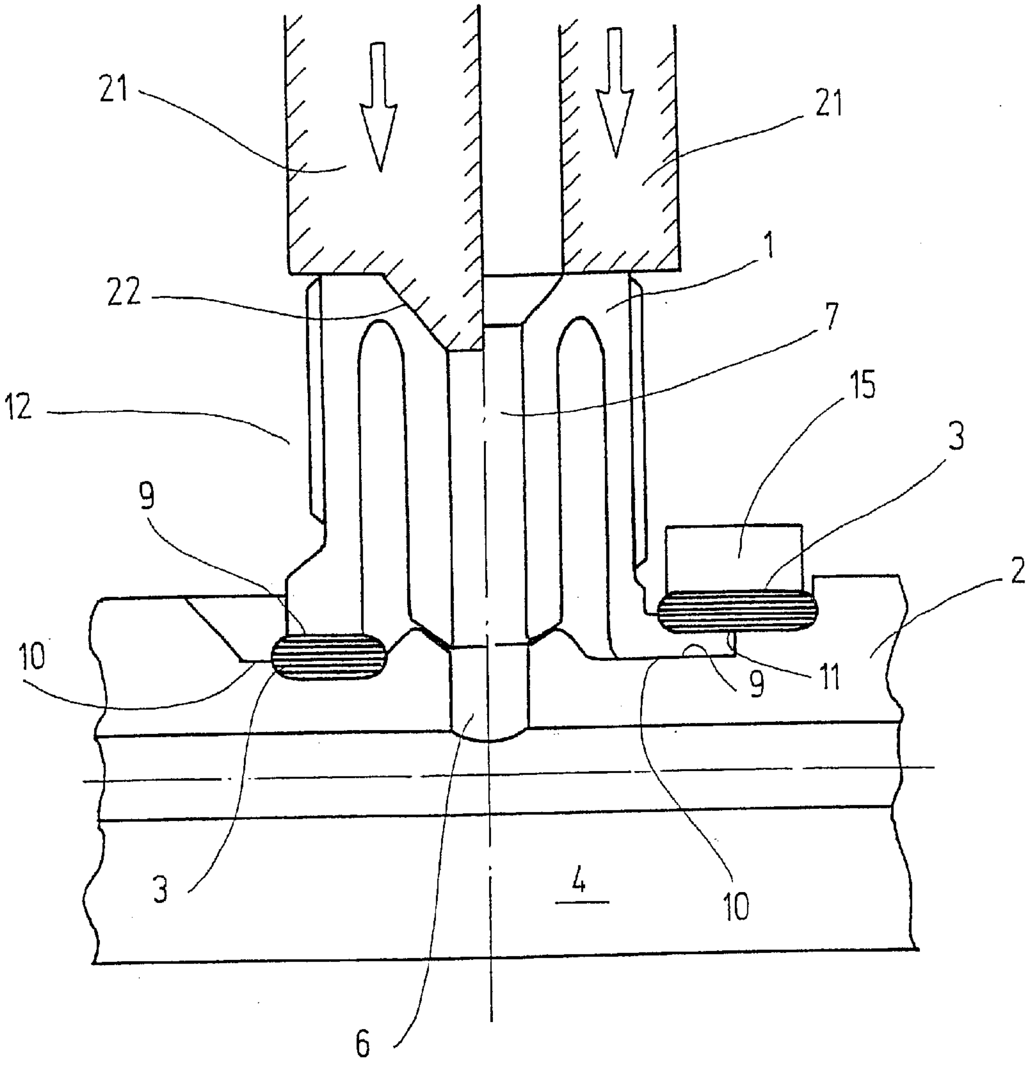
FIG. 3 schematically illustrates the welding of a connection stub, in the embodiment shown in FIG. 2, in the prestressed state.

FIG. 3 shows how the connection of the connection stub 1 and the housing 2 can be made. The right and left halves of FIG. 3, similarly to FIG. 2, each again show different structural features. In addition, a die 21 can be seen, with the aid of which the connection stub 1 is pressed onto the housing 2 until the collar 9 is seated on the annular face 10. In the left half of FIG. 3, a die 21 with a centering mandrel 22 is shown, while in the right half of FIG. 3 a die 21 without a centering device is shown.

All the characteristics described in the specification, recited in the ensuing claims and shown in the drawing can be essential to the invention, both individually and in arbitrary combination with one another.

The foregoing relates to preferred exemplary embodiments of the invention, it being understood that other variants and embodiments thereof are possible within the spirit and scope of the invention, the latter being defined by the appended claims.

What is claimed is:

1. A connection stub (1) for connecting a high pressure line (5) in a fuel injection system for internal combustion engines to a housing (2) having a through bore (6) leading to the interior of the housing, an annular face (10) and a sealing face (14) concentric to the through bore in said housing, said sealing face being disposed closer to the interior of the housing than said annular face, said connection stub (1) having a through bore (7) with a longitudinal axis extending longitudinally relative to said connection stub (1), a first end of the connection stub (1), on which a collar (9) having an annular face is disposed concentrically with the through bore (7) of the connection stub, and a second end, on which a sealing face (19) for the high-pressure line (5) and means (8) for connecting the high-pressure line (5) and the connection stub (1) are disposed, said sealing face (19) on said second end being disposed closer to the through bore (7) of the connection stub than said means (8) for connecting the high-pressure line (5) to the connection stub, said connection stub (1) comprising a prestressing element on its first end, said prestressing element being disposed concentrically with the through bore (7) of the connection stub, and a sealing face (13) disposed on the end of said prestressing element remote from the first end of the connection stub (1), wherein the annular face on said collar is spaced from the sealing face on said prestressing element a greater distance than the annular face on said housing is spaced from the sealing face on said housing.

2. The connection stub (1) of claim 1, wherein the prestressing element (12) protrudes past the collar (9) in the direction of the longitudinal axis of the through bore (7).

3. The connection stub (1) of claim 2, wherein the sealing face (13) of the prestressing element is frustoconical.

4. The connection stub (1) of claim 1, wherein the prestressing element (12) has a first and second portion (17, 18), the first portion (17) extending from the first end of the connection stub (1) in the direction of the second end of the connection stub (1), and the second portion (18) being disposed concentrically with the first portion (17) and extending in the opposite direction.

5. The connection stub (1) of claim 4, wherein the first portion (17) of the prestressing element (12) is displaceable relative to the second portion (18) in the direction of the sealing face (13) of the prestressing element (12).

6. The connection stub (1) of claim 4, wherein the sealing face (13) of the prestressing element is frustoconical.

7. The connection stub (1) of claim 1, wherein the sealing face (13) of the prestressing element is frustoconical.

8. The connection stub (1) of claim 1, wherein the sealing face (13) of the prestressing element has the form of a circular-annular face.

9. The connection stub (1) of claim 1, wherein an outer diameter of the prestressing element (12) is at least in part smaller than an outer diameter of the sealing face (13) of the prestressing element.

10. The connection stub (1) of claim 1, wherein the sealing face (13) of the prestressing element (12), projected in the direction of the longitudinal axis of the connection stub (1) onto the area enclosed by the collar (9) is located inside the area enclosed by the collar (9).

11. A method for joining a high-pressure housing (2) and a connection stub (1) of claim 1 comprising the steps of:

introducing the prestressing element (12) into an indentation (11) of the housing (2);

prestressing the prestressing element (12);

welding the housing (2) and the connection stub (1) in the prestressed state; and maintaining the prestressing until the weld seam has cooled down enough that it can transmit the prestressing.

12. In a housing (2) for fuel injection system for internal combustion engines, said housing having a through bore (6) leading to the interior of the housing, an annular face (10) and a sealing face (14) concentric to the through bore (6) in said housing, said sealing face being disposed closer to the interior of the housing than said annular face and a connection stub (1) that has a through bore (7) and communicates in fluid-tight fashion with the housing (2), wherein the housing interior (4) and the through bore (7) in the connection stub (1) communicate hydraulically through the bore (6) in the housing (2), the improvement wherein said connection stub includes means (9) for connecting the connection stub to the housing (2) and means (13) for sealing the connection stub to the housing (2) and the means (9) for connecting the connection stub to the housing (2) and the means (13) for sealing the connection stub to the housing (2) are spatially separated from one another a greater distance than the annular face on said housing is spaced from the sealing face on said housing.

13. The housing (2) of claim 12, wherein said means for connecting the connection stub to the housing comprises a collar (9) disposed concentrically to the through bore (7), on a first end of the connection stub (1); that the connection stub (1), on its first end, has a prestressing element (12) disposed concentrically with the through bore (7), on the end of which prestressing element, remote from the first end of the connection stub (1), said means for sealing the connection stub to the housing (2) in the form of a sealing face (13) is disposed; that the annular face (10) has a diameter is equivalent to that of the collar (9), and the sealing face (14) in said housing is located in the bottom of a concentric indentation (11) formed in said housing; and that when the housing (2) and the connection stub (1) are not connected, the axial spacing between the sealing face (14) in said housing and the annular face (10) is less than the axial spacing between the sealing face (13) on the prestressing element and the collar (9).

14. The housing (2) of claim 13, wherein the sealing face (13) of the prestressing element (12) and the sealing face (14) in the housing (2) are frustoconical with each sealing face having a cone angle, and, in the dismantled state, the cone angle of the sealing face (13) of the prestressing element (12) is greater than the cone angle of the sealing face (14) in the housing (2).

15. The housing (2) of claim 13, wherein the sealing face (13) of the prestressing element (12), projected in the direction of the longitudinal axis of the connection stub (1) onto the area enclosed by the collar (9) is located inside the area enclosed by the collar (9); and that the sealing face (14) of the housing (2) projected in the direction of the longitudinal axis of the bore (6) onto the area enclosed by the annular face (10) is located inside the area enclosed by the annular face (10).

16. A method for joining a high-pressure housing (2) and a connection stub (1) of claim 13 comprising the steps of:

introducing the prestressing element (12) into an indentation (11) of the housing (2);

prestressing the prestressing element (12);

welding the housing (2) and the connection stub (1) in the prestressed state; and maintaining the prestressing until the weld seam has cooled down enough that it can transmit the prestressing.

17. The housing (2) of claim 12, wherein said means for connecting the connection stub to the housing comprises a collar (9) disposed concentrically to the through bore (7), on a first end of the connection stub (1); that on a second end of the connection stub, a sealing face (19) for a high-pressure line (5) and means (8) for connecting the high-pressure line (5) and the connection stub (1) are present; that the connection stub (1), on its first end, has a prestressing element (12) disposed concentrically with the through bore (7), on the end of which prestressing element, remote from the first end of the connection stub (1), said means for sealing the connection stub to the housing (2) in the form of a sealing face (13) is disposed; that the prestressing element (12) has a first and a second portion (17, 18), the first portion (17) extending from the first end of the connection stub (1) in the direction of the second end of the connection stub (1), and the second portion (18) being disposed concentrically with the first portion (17) and extending in the opposite direction; that the annular face (10) has a diameter equivalent to that of the collar (9), and the sealing face (14) in said housing is located in the bottom of a concentric indentation (11) formed in said housing; and that when the housing (2) and the connection stub (1) are not connected, the axial spacing between the sealing face (14) in said housing and the annular face (10) is less than the axial spacing between the sealing face (13) on the prestressing element and the collar (9).

18. The housing (2) of claim 17, wherein the sealing face (13) of the prestressing element (12) and the sealing face (14) in the housing (2) are frustoconical with each sealing face having a cone angle, and, in the dismantled state, the cone angle of the sealing face (13) of the prestressing element (12) is greater than the cone angle of the sealing face (14) in the housing (2).

19. The housing (2) of claim 12, wherein said means for connecting the connection stub to the housing comprises a collar (9) and said means for sealing the connection stub to the housing comprises a sealing face (13); that the annular face (10) has a diameter equivalent to that of the collar (9), and the sealing face (14) in said housing is located in the bottom of a concentric indentation (11) formed in said housing; said connection stub further comprising a prestressing element (12); said through bore (7) of the connection stub (1) extending through the prestressing element; and said sealing face (13) of the connection stub (1) being formed at one end of the prestressing element (12); and that when the housing (2) and the connection stub (1) are not connected, the axial spacing between the sealing face (14) in said housing and the annular face (10) is less than the axial spacing between the sealing face (13) on the prestressing element and the collar (9).

20. The housing (2) of claim 12, wherein the connection stub (1) is joined to the housing (2) by welding.

* * * * *